(12) United States Patent
Kino (10) Patent No.: US 7,163,233 B2
(45) Date of Patent: Jan. 16, 2007

(54) HEAD-PROTECTING AIRBAG

(75) Inventor: Masao Kino, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 358 days.

(21) Appl. No.: 10/765,845

(22) Filed: Jan. 29, 2004

(65) Prior Publication Data

US 2004/0183286 A1 Sep. 23, 2004

(30) Foreign Application Priority Data

Feb. 13, 2003 (JP) ............... 2003-035495

(51) Int. Cl.
*B60R 21/16* (2006.01)
(52) U.S. Cl. ............... 280/730.2; 280/743.2
(58) Field of Classification Search ............... 280/729, 280/730.2, 743.1, 743.2
See application file for complete search history.

(56) References Cited

U.S. PATENT DOCUMENTS

| | | | |
|---|---|---|---|
| 5,586,782 A * | 12/1996 | Zimmerman et al. | 280/730.2 |
| 5,718,450 A * | 2/1998 | Hurford et al. | 280/730.2 |
| 6,270,113 B1 * | 8/2001 | Wipasuramonton et al. | 280/730.2 |
| 6,334,625 B1 * | 1/2002 | Pausch et al. | 280/729 |
| 6,364,348 B1 * | 4/2002 | Jang et al. | 280/730.2 |
| 6,450,529 B1 * | 9/2002 | Kalandek et al. | 280/730.2 |
| 6,457,745 B1 * | 10/2002 | Heigl | 280/743.2 |
| 6,478,329 B1 * | 11/2002 | Yokoyama | 280/729 |
| 6,886,858 B1 * | 5/2005 | Olson | 280/743.2 |
| 6,916,039 B1 * | 7/2005 | Abe | 280/729 |
| 6,976,702 B1 * | 12/2005 | Yokota et al. | 280/730.2 |

FOREIGN PATENT DOCUMENTS

JP      A-2002-316609      10/2002

* cited by examiner

*Primary Examiner*—Paul N. Dickson
*Assistant Examiner*—Toan C. To
(74) *Attorney, Agent, or Firm*—Posz Law Group, PLC (57) ABSTRACT

A head-protecting airbag according to the present invention is normally folded and housed in an upper edge of windows inside a vehicle, and deployable downward from the upper edge of windows upon inflow of inflation gas to cover the vehicle's inner side of the windows. The airbag internally includes a tether joined to the vehicle's inner side wall and the vehicle's outer side wall for regulating the clearance between the inner side wall and the outer side wall as the airbag is completely inflated. The tether is disposed along the front-rear direction of the vehicle. A joint portion of the tether to the vehicle's inner side wall is located at lower level than a joint portion of the tether to the vehicle's outer side wall as viewed in a vertical section taken along the vehicle's transverse direction. The head-protecting airbag of the present invention is able to expand along the windows.

6 Claims, 7 Drawing Sheets

HEAD-PROTECTING AIRBAG

The present application claims priority from Japanese Patent Application No. 2003-035495 filed on Feb. 13, 2003, the entirety of which is hereby incorporated into the present application by this reference.

BACKGROUND OF THE INVENTION

1. Field of the Invention

The present invention relates to a head-protecting airbag which is normally folded and housed in an upper edge of windows, and deployable downward from the upper edge of windows to cover interior side of windows upon inflow of inflation gas.

2. Description of Related Art

Conventionally, a head-protecting airbag is normally folded and housed in an upper edge of windows, and upon inflow of inflation gas, deploys downward from the upper edge of windows to cover interior side of windows. In the prior art, Japanese Patent Laid-Open No. 2002-316609 is illustrative of an airbag which includes an inner tube to guide inflation gas flowing in the airbag for stabilizing the expanding direction of the airbag in consideration of a narrow space between a vehicle occupant and windows.

This airbag in the prior art internally locates the inner tube at its upper edge, and includes an inflator connected with the inner tube for supplying inflation gas thereinto. The inner tube is provided with a plurality of gas discharge ports arranged along the substantially front-rear direction of vehicle. The ports are directed toward a predetermined direction for the airbag to expand.

Thus, upon airbag deployment, inflation gas is discharged from the inner tube in a predetermined direction, and the airbag deploys in the direction of inflation gas.

In the head-protecting airbag with an inner tube, however, since the inner tube provided for guiding the expanding direction of the airbag is located within and at the upper edge of the airbag, there is a room for improvement in assuring the expanding direction of a lower portion of the airbag in the course of deployment.

The airbag in the prior art also has a room for improvement in expanding its lower part along the windows to thrust itself between the occupant and the windows, especially when the space is narrow.

SUMMARY OF THE INVENTION

The present invention contemplates to solve the above-mentioned problems, and has an object to provide a head-protecting airbag capable of expanding along the windows.

The head-protecting airbag according to the present invention is normally folded and housed in an upper edge of windows inside a vehicle, and deployable downward from the upper edge of windows upon inflow of inflation gas to cover the vehicle's inner side of the windows. The airbag internally includes a tether joined to the vehicle's inner side wall and the vehicle's outer side wall for regulating the clearance between the inner side wall and the outer side wall as the airbag is completely inflated. A joint portion of the tether to the vehicle's inner side wall is located at lower level than a joint portion of the tether to the vehicle's outer side wall as viewed in a vertical section taken along the vehicle's transverse direction.

In the head-protecting airbag of the present invention, since the joint portion of the tether to the vehicle's inner side wall is located lower than the joint portion of the tether to the vehicle's outer side wall, the vertical length of a part of the inner side wall above the joint portion is longer than the vertical length of a part of the outer side wall above the joint portion in the airbag portion above the tether. Accordingly, as the upper portion of the airbag starts to inflate, a portion of the airbag below the tether is directed toward the vehicle's exterior side. If the lower portion of the airbag below the tether inflates in that condition, the lower portion smoothly expands and inflates along the windows.

Therefore, the head-protecting airbag according to the present invention is able to expand along the windows. At this time, if the lower portion of the airbag below the tether mainly functions as a protections area of an occupant's head, the portion for protecting the occupant is able to expand along the windows and smoothly take position in a space between the occupant's head and the windows, even if the space is narrow.

If the tether is provided between the joint portions to the vehicle's inner side wall and the outer side wall with a through hole communicating upper side with the lower side of the tether, the following working-effects are obtained: When the upper portion of the airbag above the tether inflates to tense the tether toward the interior and exterior directions of the vehicle, the through hole directs the lower end of its axial direction toward the exterior side or obliquely downward, since the joint portion of the tether to the inner side wall is located lower than the joint portion of the tether to the outer side wall. Accordingly, the inflation gas flowing into the portion of the airbag below the tether through the through hole flows toward the vehicle's exterior side or obliquely downward, which further helps expand the lower portion of the airbag along the windows.

In this case, the tether may be disposed along the front-rear direction of vehicle and include a plurality of the through holes arranged intermittently along the front-rear direction of vehicle.

With this arrangement, a wide area along the front-rear direction of the airbag below the tether is able to expand and inflate along the windows smoothly.

It is desired that the airbag of the present invention is formed into bag shape by sewing work and that the tether is also joined to the vehicle's inner side wall and the vehicle's outer side wall by sewing work.

With this arrangement, the tether is easily formed within the airbag, compared with a case of forming the airbag by hollow-weaving method.

At this time, it is desired that the airbag employs a body cloth as a constituent part for constituting the vehicle's inner side wall and the outer side wall which has a shape in which the vehicle's inner side wall and the outer side wall are connected at lower ends of each other and, that the bag shape of the airbag is formed by folding the body cloth in two on a fold located at a position to be the lower end of the airbag, and sewing up the overlapped outer peripheries of the cloth.

With this arrangement, the airbag is easily manufactured without sewing up the lower edge side of the airbag.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
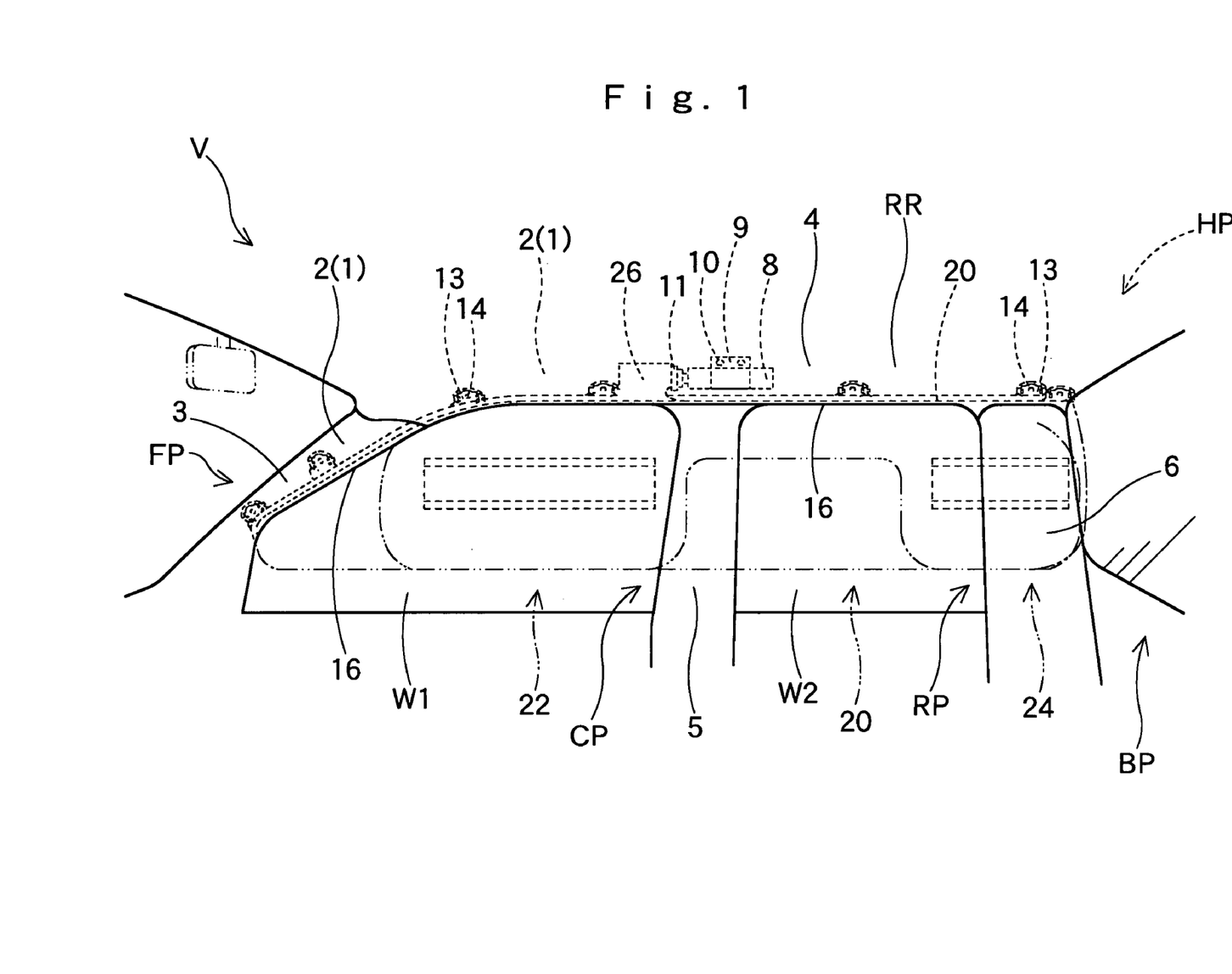
FIG. 1 is a front view of a head-protecting airbag device employing an airbag according to the present invention, as viewed from the vehicle's inner side.

Referring to FIG. 1, it is seen that an airbag 20 according to the present invention is employed in a head-protecting airbag device HP mountable on a vehicle V. The head-protecting airbag device HP is located in a front pillar FP and a roof side rail RR in the upper edges of windows (or side windows) W1, W2 and a rear pillar RP of the vehicle V. The vehicle V is a pickup-type vehicle with two rows of seats that includes a center pillar CP between the front pillar FP and the rear pillar RP, and a rear wall BP rearward of the rear pillar RP. In the vehicle V, the window W1 is located at the side of the front seat, and the window W2 is located at the side of the rear seat.

The head-protecting airbag device HP includes an inflator 8, mounting brackets 9 and 13, mounting bolts 10 and 14, and the airbag 20, as shown in FIG. 1, and is normally housed while being covered by an airbag cover 16 at vehicle's interior side. The airbag cover 16 is constituted by lower edges of a front pillar garnish 3 covering vehicle's interior side of the front pillar FP and a roof head lining 4 covering vehicle's interior side of the roof side rail RR.

The front pillar garnish 3 and the roof head lining 4 are made from synthetic resin, and are attached to vehicle's interior side of an inner panel 2 as a member of vehicle body 1 in the front pillar FP and the roof side rail RR by means of not-shown mounting means. The lower edges of the front pillar garnish 3 and the roof head lining 4 are adapted to open inward at their lower ends to allow the deploying airbag 20 to protrude therefrom.

The inflator 8 has a substantially cylindrical shape, and is provided toward its leading (front) end with not-shown gas discharge ports for discharging inflation gas. The leading end side of the inflator 8 including the vicinity of the gas discharge ports is inserted into a later-described joint port 26 of the airbag 20. Thus and by means of a cramp 11 mounted around the rear end of the joint port 26, the inflator 8 is connected to the airbag 20. The inflator 8 is attached to the inner panel 2 of the vehicle body 1 by means of a mounting bracket 9 holding the inflator 8 and mounting bolts 10 for securing the mounting bracket 9 to the inner panel 2.

Here, the inflator 8 is mounted on the vehicle V as a part of an airbag module composed of the inflator 8 and the airbag 20 assembled together.

Referring to FIGS. 1 to 6, the airbag 20 is housed in a folded state from the front pillar FP extending obliquely upward to the position above the rear pillar RP in the roof side rail RR, passing over the center pillar CP. As indicated by double-dotted lines in FIG. 1, the airbag 20 upon deployment is adapted to cover vehicle's interior side I of each of the windows W1, W2, the center pillar CP and the rear pillar RP.

Figure 2:
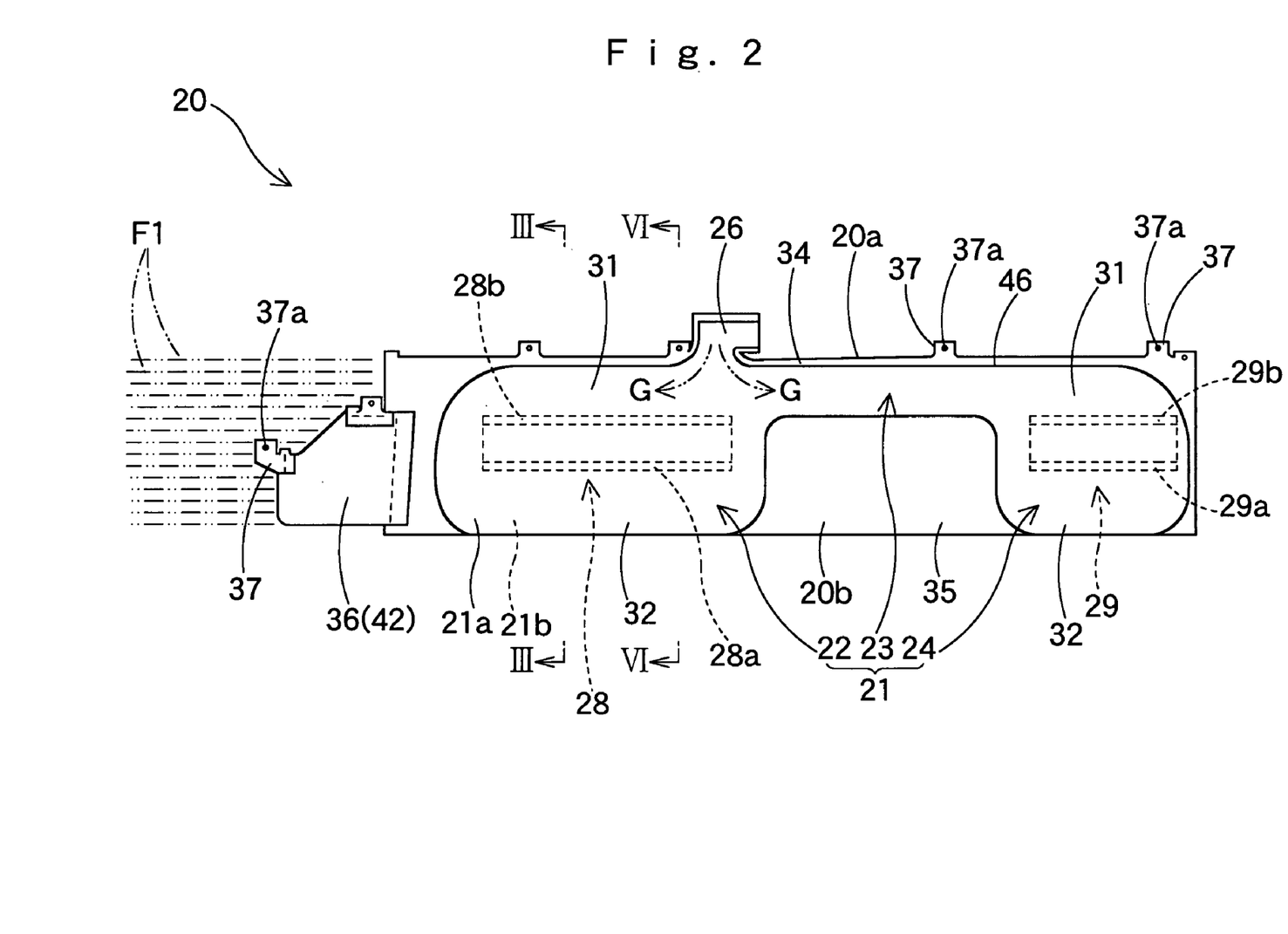
FIG. 2 is a front view of the airbag of the present invention.

The airbag 20 includes a gas admissive portion 21 which admits inflation gas G inside to separate its vehicle's inner side wall 21a and vehicle's outer wall 21b, and a non-admissive portion 34 which admits no inflation gas G. The non-admissive portion 34 is located in the periphery of the gas admissive portion 21.

The gas admissive portion 21 includes a front inflatable portion 22 for covering the window W1 at the side of the front seat, a rear inflatable portion 24 for covering the window W2 at the side of the rear seat, and a communication passage 23 extending in the front-rear direction along the upper edge 20a of the airbag body 20 to communicate the front inflatable portion 22 and the rear inflatable portion 24. The gas admissive portion 21 further includes a cylindrical joint port 26 located proximate to the longitudinal center of the upper edge 20a of the airbag 20. The joint port 26 is mounted around the front end of the inflator 8 for introducing inflation gas G from the inflator 8 into the inflatable portions 22, 23 and 24.

The non-admissive portion 34 is located in the periphery of the gas admissive portion 21. The non-admissive portion 34 includes a panel portion 35 that is located between the front and rear inflatable portions 22 and 24 below the communication passage 23, and has a substantially rectangular panel shape admitting no inflation gas G. The non-admissive portion 34 further includes a second panel portion 36 that has a triangular panel shape and is located at the front end side of the gas admissive portion 21. These panel portions 35 and 36 are located in regions where no vehicle occupants are positioned, that is, in a front part of the window W2 rearward of the center pillar CP, and at a lower part the front pillar FP. The panel portions 35 and 36 are adapted to define the entire shape of the airbag 20, and to minimize the time to inflate the airbag 20 by reducing the volume of portions admitting inflation gas G.

There are projected upward a plurality of mounting portions 37 for bolt 14 fixing the airbag 20 to the inner panel 2 along the upper edge 20a of the airbag 20 in the non-admissive portion 34. Each of the mounting portions 37 is provided with a mounting hole 37a to put a bolt 14 therethrough, and a mounting bracket 13 as a stiffening plate is attached thereto. Each of the mounting portions 37 is secured to the inner panel 2 together with the mounting bracket 13 by means of the bolt 14.

The front and rear inflatable portions 22 and 24 internally include tethers 28 and 29 disposed along front-rear direction of the vehicle V, respectively, for inflating the respective inflatable portions 22 and 24 in substantially plate shapes by regulating clearances between the inner side wall 21a and the outer sidewall 21b. Each of the tethers 28 and 29 is joined to the vehicle's inner and outer side walls 21a and 21b so as to connect the vehicle's interior side I and the exterior side O.

Figure 3:
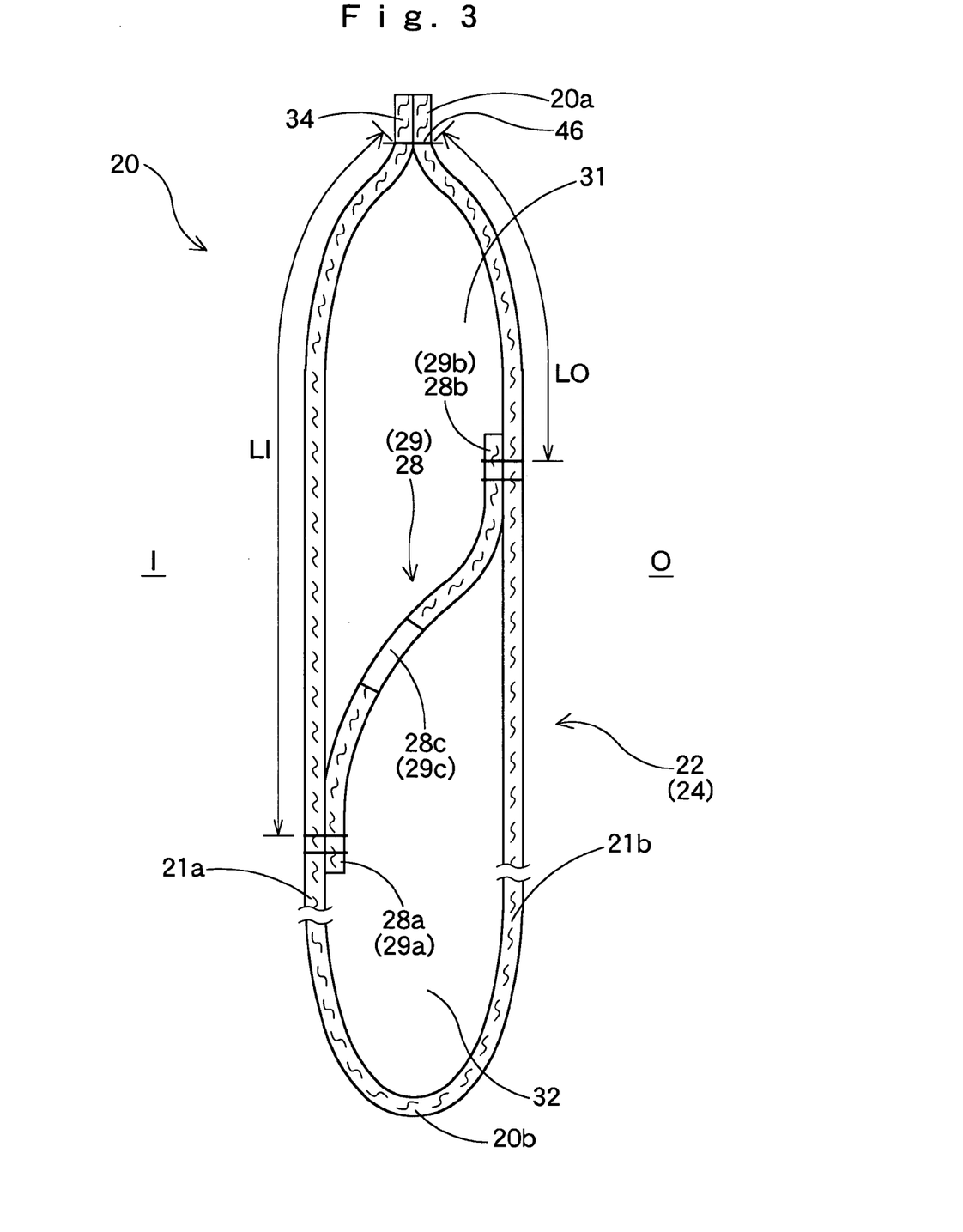
FIG. 3 is a vertical section taken along line III—III of FIG. 2.

As referred to FIGS. 2 and 3, with regard to joint portions of the tethers 28 and 29 to the vehicle's inner side wall 21a and the outer side wall 21b, joint portions 28a and 29a where the tethers 28 and 29 are joined to the inner side wall 21a are located at lower level than joint portions 28b and 29b where the tethers 28 and 29 are joined to the outer side wall 21b, as viewed in a state in which the inner side wall 21a and the outer side wall 21b are overlaid on each other. Thus, vertical length LI, as shown in FIG. 3, of a part of the inner side wall 21a above the joint portions 28a and 29a is longer than vertical length LO of a part of the outer side wall 21b above the joint portions 28b and 29b in the airbag portions 31 above the tethers 28 and 29.

In the foregoing embodiment, the joint portions 28a and 29a toward the vehicle's interior side I are formed in substantially intermediate positions in the vertical widths of the front and rear inflatable portions 22 and 24, while the joint portions 28b and 29b toward the vehicle's exterior side O are formed at two third positions of the vertical widths of the front and rear inflatable portions 22 and 24 from the lower edge 20b, or at substantially same level as the upper edge 35a of the panel portion 35.

The airbag 20 upon deployment is adapted to protect occupants' heads mainly with its portions 32 below the tethers 28 and 29.

Each of the tethers 28 and 29 is joined to the walls 21a and 21b by sewing work utilizing stitching yarn 46.

Moreover, each of the tethers 28 and 29 is provided with a plurality of through holes 28c and 29c between the joint portions 28a and 28b or between the joint portions 29a and 29b, which communicate upper side with lower side of the tethers 28 or 29 and are formed intermittently along the front-rear direction.

Figure 4:
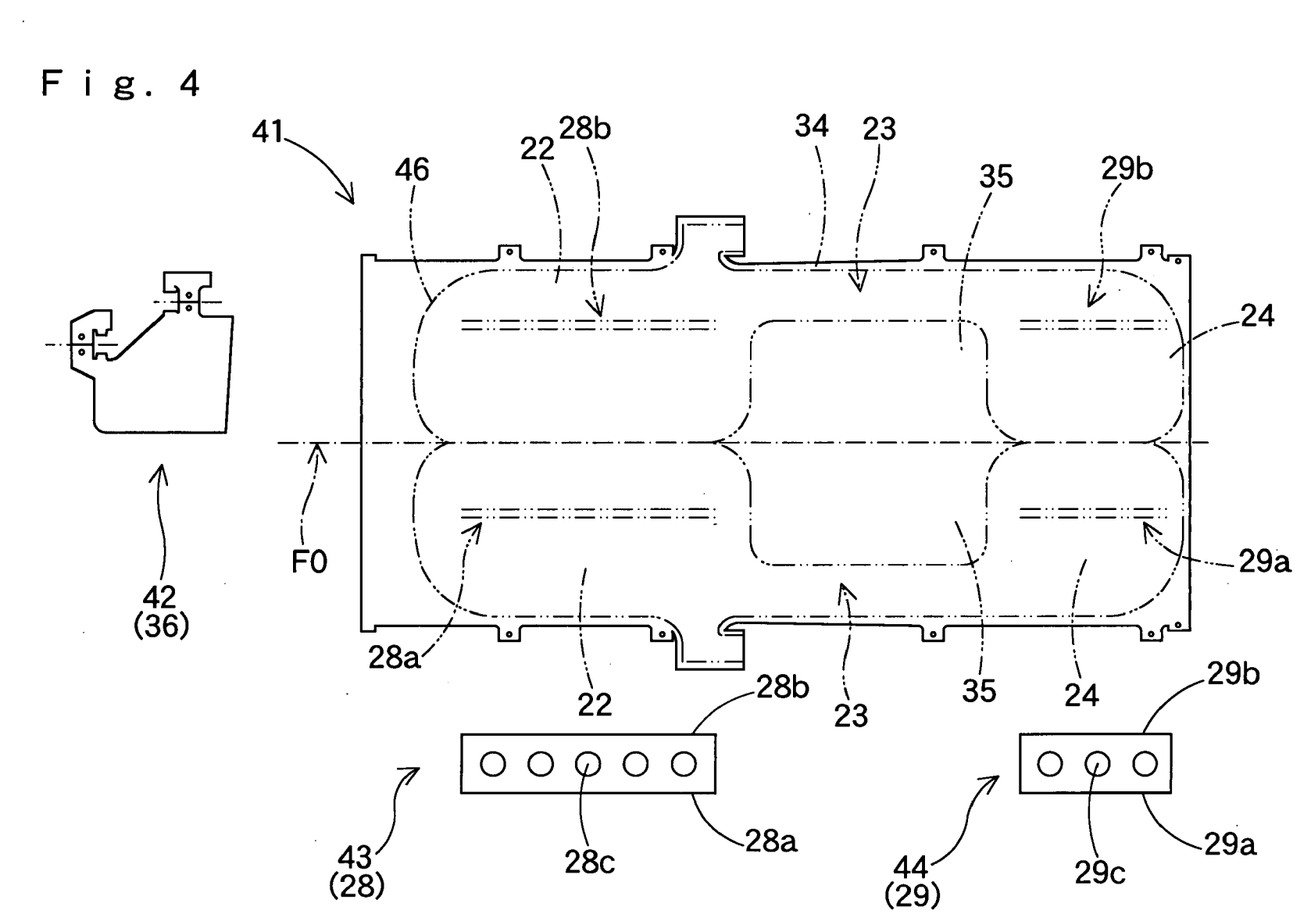
FIG. 4 is an exploded plan view of a cloth member constituting the airbag of FIG. 2.
Figure 5A:
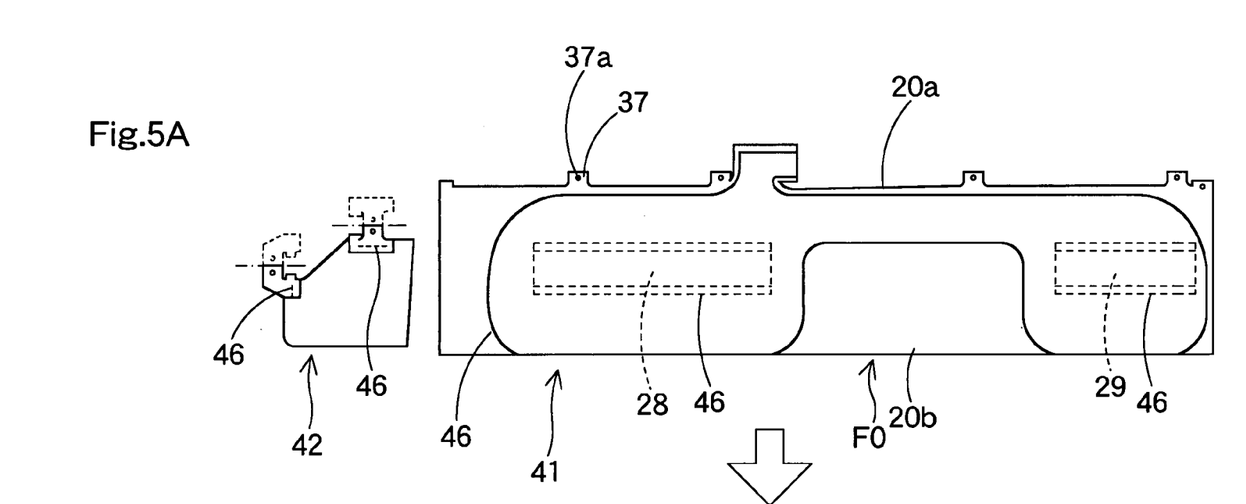
FIGS. 5A and 5B illustrate the manufacturing of the airbag of FIG. 2.
Figure 5B:
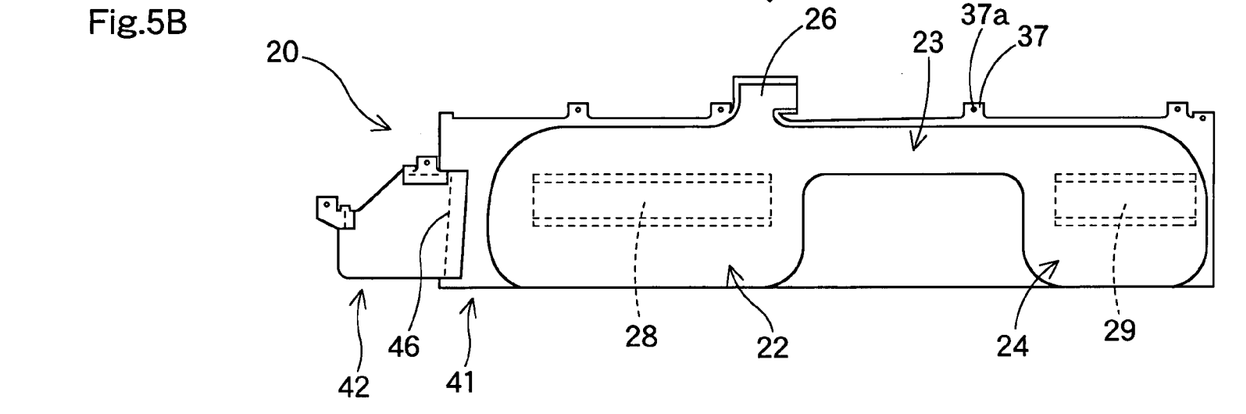

The airbag 20 is manufactured by joining predetermined portions of flexible cloth members woven of polyamide yarns, polyester yarns or the like, not by hollow-weaving method. Referring to FIGS. 4 and 5, the airbag 20 is manufactured by sewing work of four cloth members of a body cloth 41 to be folded up in two, a front cloth 42 to be joined to the front end of the body cloth 41, and band-shaped cloth members 43 and 44 elongated in the front-rear direction for constituting the tethers 28 and 29, utilizing the stitching yarn 46. The body cloth 41 forms the front and rear inflatable portions 22 and 24 of the gas admissive portion 21, the communication passage 23, and the joint port 26. The body cloth 41 is folded in two on a fold F0 at a position to be the lower edge 20b of the airbag 20, and sewn up at positions to be the outer periphery of the gas admissive portion 21 by the stitching yarn 46 in the state where its two sides are overlaid on each other. Thus the front and rear inflatable portions 22 and 24, the communication passage 23, and the joint port 26 are formed.

Here, during the sewing work, each of the tethers 28 and 29 is stitched at its inner side end 28a/29a and its outer side end 28b/29b to portions to be the vehicle's inner side wall 21a and the outer side wall 21b of the inflatable portion 22/24. Thus the tethers 28 and 29 are located in the inflatable portions 22 and 24.

The front cloth 42 is joined at the front end of the body cloth 41 so as to expand downward from the front pillar FP upon deployment of the airbag 20. The front cloth 42 is provided at its upper edge with two mounting portions 37. As shown in FIGS. 4 and 5A, these mounting portions 37 are formed into two-ply by being folded up from flat expanded state and sewn by the stitching yarn 46. While the mounting portions 37 are formed, the front cloth 42 is stitched to the front end of the body cloth 41 with the stitching yarn 46, as shown in FIGS. 5A and 5B.

The airbag 20 thus manufactured is bellows-folded, from flat expanded, and deflated state, substantially vertically on folds F1 parallel to the upper edge 20a, as indicated by double-dotted lines in FIG. 2, so that its lower edge 20b is brought closer to the upper edge 20a. Subsequently, a not-shown breakable wrapping member is wound around the folded airbag 20 for keeping the folded-up configuration. Then the individual mounting portions 37 are taken out, and the mounting brackets 13 are fixed thereto. In the meantime, the inflator 8 with the mounting bracket 9 attached thereto is inserted into the joint port 26, and the inflator 8 and the joint port 26 are fastened together with the cramp 11. Thus is formed an airbag module. By locating the individual mounting brackets 9 and 13 at predetermined positions of the inner panel 2, and fastening them with the bolts 10 and 14, the airbag module is mounted on the vehicle V.

Thereafter, a not-shown lead wire extending from a predetermined control device for actuating the inflator is connected to the inflator 8. If the front pillar garnish 3, the roof head lining 4, and further the center pillar garnish 5 and the rear pillar garnish 6 are attached to the vehicle body 1, the head-protecting airbag device HP is mounted on the vehicle V.

When the inflator 8 is actuated after the airbag device HP is mounted on the vehicle V, the inflation gas G is discharged from the inflator 8 and flows into the front inflatable portion 22, the communication passage 23, and the rear inflatable portion 24 via the joint port 26. The airbag 20 then breaks the wrapping member, pushes and opens the airbag cover 16 in the lower edges of the front pillar garnish 3 and the roof head lining 4, and inflates to cover the vehicle's inner side of the windows W1 and W2, the center pillar CP, and the rear pillar RP as indicated by double-dotted lines in FIG. 1.

In the airbag 20 according to the present invention, since the joint portions 28a and 29a where the tethers 28 and 29 are joined to the inner side wall 21a are located at lower level than the joint portions 28b and 29b where the tethers 28 and 29 are joined to the outer side wall 21b, the vertical length LI of the part of the inner side wall 21a above the joint portions 28a and 29a is longer than the vertical length LO of the part of the outer side wall 21b above the joint portions 28b and 29b in the airbag portions 31 above the tethers 28 and 29.

Figure 6:
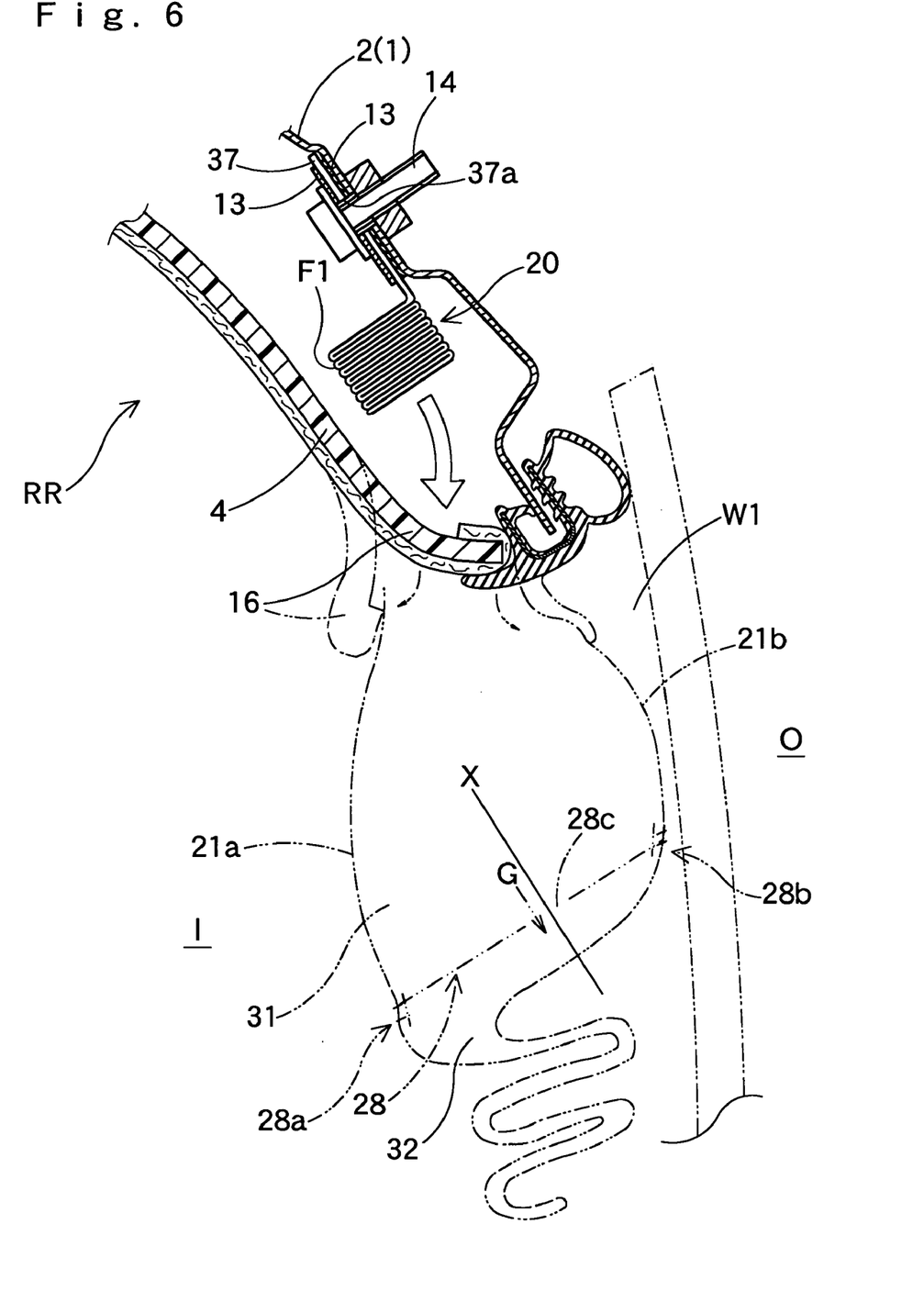
FIG. 6 is a sectional view showing the airbag of FIG. 2 in the housed state, taken along line VI—VI in FIG. 2.
Figure 7:
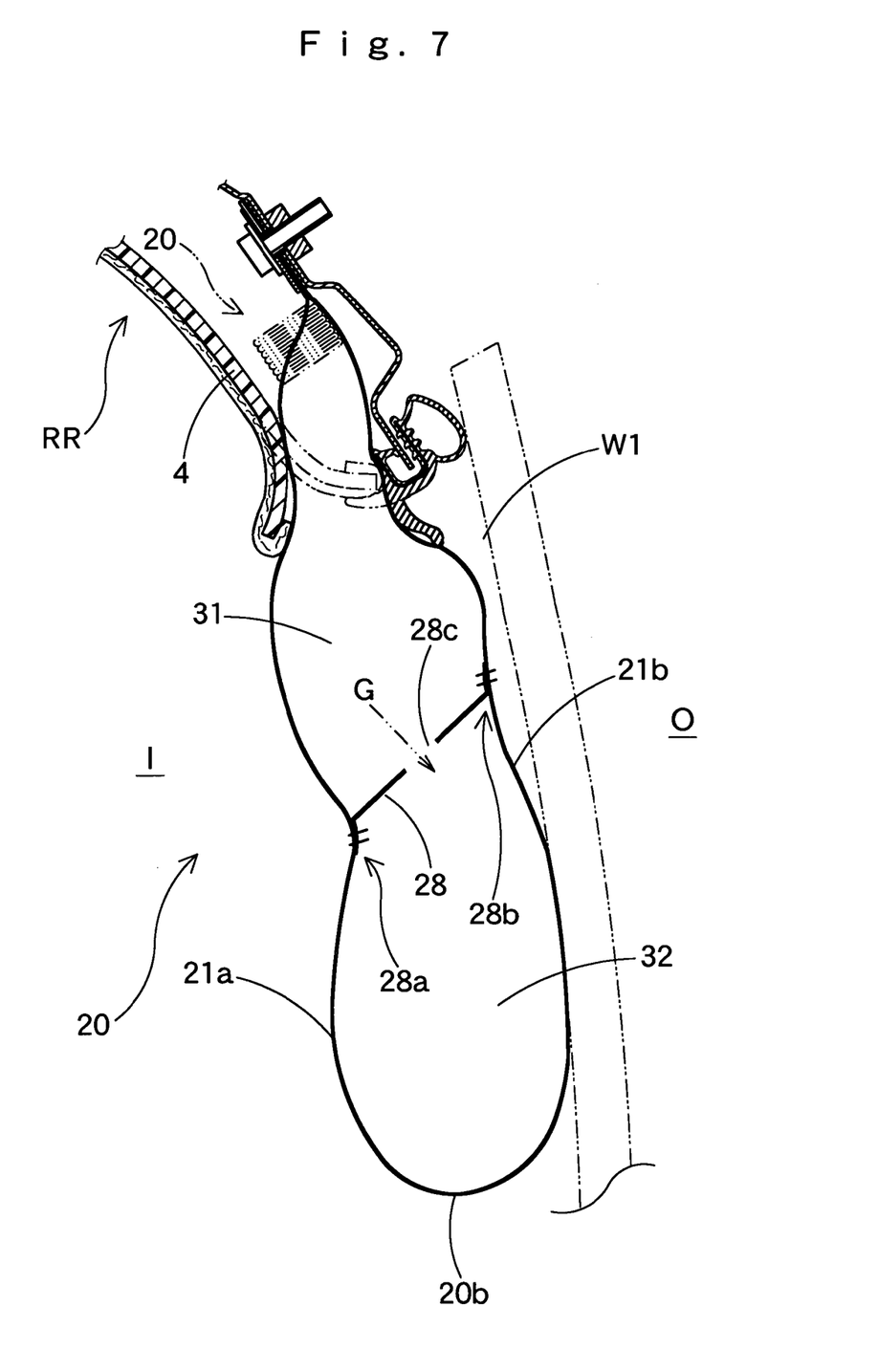
FIG. 7 is a sectional view showing the airbag of FIG. 2 completely inflated.

Thus, referring to FIG. 6, as the upper portions 31 of the airbag 20 start to inflate, the portions 32 of the airbag 20 below the tethers 28 and 29 are directed toward the vehicle's exterior side O. If the lower portions 32 of the airbag 20 inflate in that condition, the lower portions 32 smoothly expand and inflate along the windows W1 and W2, as shown in FIG. 7.

Therefore, the head-protecting airbag 20 according to the present invention is able to expand along the windows W1 and W2. In the airbag 20, moreover, the lower portions 32 of the airbag 20 below the tethers 28 and 29 mainly function as protections areas of occupants' heads. Since the lower portions 32 are able to take positions in a narrow space between the occupants' heads and the windows W1 and W2 by expanding along the windows W1 and W2, the occupants' heads are properly protected.

In the foregoing embodiment, the tethers 28 and 29 are provided between the joint portions 28a and 28b and between the joint portions 29a and 29b, respectively, with a plurality of through holes 28c and 29c communicating the upper side with the lower side of the tethers 28 and 29. As referred to FIGS. 6 and 7, then, when the upper portions 31 of the airbag 20 above the tethers 28 and 29 inflate to tense the tethers 28 and 29 toward the interior and exterior directions of the vehicle, the individual through holes 28c and 29c direct a lower end of their axial direction X, as shown in FIG. 6, toward the exterior side O or obliquely downward, since the joint portions 28a and 29a of the tethers 28 and 29 to the inner side wall 21a are located lower than the joint portions 28b and 29b of the tethers 28 and 29 to the outer sidewall 21b. Accordingly, the inflation gas G flowing into the portions 32 of the airbag 20 below the tethers 28 and 29 through the through holes 28c and 29c flows toward the vehicle's exterior side O or obliquely downward, which further helps expand the lower portions 32 of the airbag 20 along the windows W1 and W2.

In the foregoing embodiment, each of the inflatable portions 22 and 24 includes each one tether 28/29, and the joint portion 28a/29a of the tether 28/29 to the inner side wall 21a is located at lower level than the joint portion 28b/29b to the outer side wall 21b. However, this arrangement may be applied only to one of the tethers 28 and 29. For example, the tether 29 may locate its ends 29a and 29b at the same level while the other tether 28 locates the inner side end 28a lower than the outer side end 28b. Alternatively, it will also be appreciated that a plurality of tethers are formed in an inflatable portion, and at least one of the tethers locates its inner side end lower than the outer side end.

When a plurality of tethers are formed in an inflatable portion, the tethers may be arranged along the front-rear direction, along the vertical direction of vehicle, or in a mixed manner of these, provided that at least one of the tethers locates its inner side end lower than the outer side end.

Although the airbag 20 in the preferred embodiment is formed by sewing work of the body cloth 41, the front cloth 42, and the cloth members 43 and 44 for the tethers, the airbag may be manufactured by means of adhesion or welding.

What is claimed is:

1. A head-protecting airbag normally folded and housed in an upper edge of windows inside a vehicle, and deployable downward from the upper edge of windows upon inflow of inflation gas to cover the vehicle's inner side of the windows, the airbag comprising:
    an inner side wall and an outer side wall, wherein inner and outer side walls separate from each other upon inflation of the airbag; and
    a tether, wherein the tether is joined to the inner side wall and the outer side wall internally of the airbag such that the tether regulates a clearance between the inner side wall and the outer side wall as the airbag is completely inflated,
    a joint portion of the tether to the vehicle's inner side wall being located at lower level than a joint portion of the tether to the vehicle's outer side wall as viewed in a vertical section taken along the vehicle's transverse direction, wherein in an inflatable portion of the airbag above the tether, a length of the inner side wall above the joint portion of the tether is greater than a corresponding length of the outer side wall above the joint portion of the tether.

2. The head-protecting airbag according to claim 1, wherein a lower portion of the airbag below the tether is a substantial protection area of an occupant's head.

3. The head-protecting airbag according to claim 1, wherein the tether comprises a through hole between the joint portions to the inner side wall and the outer side wall, the hole communicating upper side with lower side of the tether.

4. The head-protecting airbag according to claim 3, wherein:
    the tether is disposed along the front-rear direction of vehicle; and
    the tether includes a plurality of the through holes arranged intermittently along the front-rear direction of vehicle.

5. The head-protecting airbag according to claim 1, wherein:
    the airbag is formed into bag shape by sewing work; and
    the tether is joined to the inner side wall and the outer side wall by sewing work.

6. The head-protecting airbag according to claim 5, wherein:
    the airbag comprises a body cloth as a constituent part for constituting the inner side wall and the outer side wall, the body cloth having a shape in which the inner side wall and the outer side wall are connected at lower ends of each other; and
    the bag shape of the airbag is formed by folding the body cloth on a fold located at the lower end of the airbag and sewing up overlapped outer peripheries of the cloth.

* * * * *